United States Patent [19]

Hund

[11] 3,946,103

[45] Mar. 23, 1976

[54] PRODUCTION OF PRECIPITATED RED IRON (III) OXIDE PIGMENT RELATIVELY FREE OF α-FEOOH

[75] Inventor: Franz Hund, Krefeld-Bockum, Germany

[73] Assignee: Bayer Aktiengesellschaft, Leverkusen, Germany

[22] Filed: Sept. 19, 1973

[21] Appl. No.: 398,730

[30] Foreign Application Priority Data

Oct. 7, 1972  Germany............................ 2249274

[52] U.S. Cl................................. 423/633; 106/304
[51] Int. Cl.$^2$..................... C01G 49/02; C09D 5/00
[58] Field of Search...................... 423/633; 106/304

[56] References Cited

UNITED STATES PATENTS

| | | | |
|---|---|---|---|
| 2,558,303 | 6/1951 | Marcot............................ | 423/633 X |
| 2,618,532 | 11/1952 | Atkins et al. ...................... | 423/633 |
| 2,618,571 | 11/1952 | Peel et al............................ | 106/304 |
| 2,620,261 | 12/1952 | Toxby................................ | 423/633 |
| 2,696,426 | 12/1954 | Marcot.............................. | 423/633 |
| 3,009,821 | 11/1961 | Bennetch........................... | 106/304 |
| 3,382,174 | 5/1968 | Hund ................................. | 423/634 |
| 3,627,554 | 12/1971 | Bockman et al................ | 106/304 X |
| 3,755,554 | 8/1973 | Lailach et al..................... | 423/633 |

Primary Examiner—Oscar R. Vertiz
Assistant Examiner—Brian E. Hearn
Attorney, Agent, or Firm—Burgess, Dinklage & Sprung

[57] ABSTRACT

In the production of a precipitated red iron (III) oxide pigment of hematite structure wherein an aqueous iron (II) salt solution is mixed with an aqueous alkali solution in substantially equivalent quantities to produce an aqueous suspension of iron (II) hydroxide or carbonate, the suspension is oxidized by passing oxygen-containing gases through it with stirring under atmospheric pressure at a temperature of about 0° to 50°C, and the resulting iron (III) seed suspension is allowed to grow into precipitated red iron (III) oxide pigment by further oxidation with an oxygen-containing gas at a temperature of about 50° to 100°C in the presence of more iron (II) salt and alkali solution or in the presence of iron (II) salt and metallic iron at a pH-value kept in the acid range, the improvement which comprises producing the iron (III) seed suspension in the presence of a foreign modifying substance so that lattice-distorted, chemically reactive finely divided delta-FeOOH seeds are formed, whereby the resulting red iron (III) oxide pigment contains less than about 15 % by weight of α-FeOOH. The modifying substance may be a chloride of magnesium, calcium or aluminum, vanadium pentoxide, sodium phosphate, erythritol, mannitol, glyceric acid, K, Na-tartrate, Na-citrate, ribose, glucose, fructose, tannin, or NH$_4$—, Ca—, Al—, Fe or Mg-lignin sulfonate.

12 Claims, No Drawings

PRODUCTION OF PRECIPITATED RED IRON (III) OXIDE PIGMENT RELATIVELY FREE OF α-FEOOH

Precipitated red iron (III) oxide pigments can be obtained by mixing an aqueous iron (II) salt solution and an aqueous alkali solution in substantially equimolar quantities, passing air through the resulting iron (II) hydroxide or carbonate suspension, preferably under atmospheric pressure and at room temperature, and heating the resulting colloidal seed suspension containing iron (III) hydroxide or aqueous iron (III) oxide, in the presence of iron (II) salt with addition either of metallic iron or of more iron (II) salt and more alkali, accompanied by oxidation with air, until a color between light red and maroon is obtained (German DAS No. 1,084,405). U.S. Pat. No. 2,785,991 and No. 2,866,686 on which this DAS is based, specify 0.9 to 1.1 equivalents of alkali, based on iron (II) salt, which corresponds to a degree of precipitation of 0.9 to 1.1, and heating at temperatures of from 50° to 100°C. As stated in U.S. Pat. No. 3,009,821, X-ray analysis of the resulting precipitated red iron (III) oxide pigments, irrespective of whether they consist of yellow- or blueish-red, pigments, shows that pigments of this kind always consist of a mixture of hexagonal-rhombohedrally crystallizing hematite—α—$Fe_2O_3$ and orthorhombic goethite—α—FeOOH. The proportion of the hematite and goethite phases present in the mixture of α—$Fe_2O_3$ and α—FeOOH is governed essentially not only by the absolute concentrations of iron (II) salt and alkali solutions, but also by the degree of precipitation of the iron (II) salt solution by the alkali solution during seed formation. It is only within the narrow range of the degree of precipitation of 0.9 to 1.1 that seeds which lead to precipitated red iron (III) oxide pigments during pigment formation are formed. In cases where larger or smaller quantities of alkali are used, yellow precipitated iron (III) oxide pigments of uniform goethite structure (α—FeOOH) are inevitably formed.

If pure goethite yellow is mixed with pure hematite red pigments (α—FeOOH + α—$Fe_2O_3$), the result is mixed colors of a yellowish to blueish red although, by comparison with pure red iron (III) oxide pigments of hematite structure, they are dirty brown and unsightly in appearance.

For sodium-D-light, the refractive indices of α—$Fe_2O_3$ (hematite) are 2.988 and 2.759 while those of α—FeOOH (geothite) amount to 2.275, 2.409 and 2.415. Apart from its color, the pigment with the higher refractive index is of greater optical efficiency, i.e. has greater tinting strength and a greater hiding power, under comparable conditions. Accordingly, there is considerable interest in producing precipitated red iron (III) oxide pigments of uniform hematite structure in a uniform particle form with different particle sizes but with the narrowest possible particle size distribution. With a uniform hematite phase, the color i.e. dominant wavelength of red iron (III) oxide pigments is governed by the particle size while, for a given particle size, the colorimetric purity, i.e. measure of color saturation is governed by the particle size distribution (Chem. Ing. Techn. 38, 423 (1966). Accordingly, it is possible in the case of red iron (III) oxide pigments, to adjust the shades of color from a yellowish to a blueish red and the high colorimetric purity with much greater optical effectiveness and color saturation through the average particle size and the particle size distribution of pure hematite phases than through a mixture of red (α—$Fe_2O_3$) and yellow iron (III) oxide pigments (α—FeOOH).

U.S. Pat. No. 3,009,821 summarizes the results of U.S. Pat. Nos. 2,785,991 and 2,866,686 by stating that the synthetic light red to deep maroon iron (III) oxide pigments consist of chemically precipitated mixtures of isometric hexagonal-rhombohedral hematite and acicular orthorhombic goethite particles, the pigment mixture containing, in addition to hematite (α—$Fe_2O_3$), 74 to 15 % by weight of goethite (α—FeOOH) according to an electron microscopic count of the isometric (α—$Fe_2O_3$)— and acicular (α—FeOOH)—pigment particles.

It is accordingly an object of the present invention to provide a process for the production of precipitated red iron (III) oxide pigments of hematite structure containing a maximum of 15 % by weight (based on total pigment) of α—FeOOH.

These and other objects and advantages are realized in accordance with the present invention which relates to a process in which an aqueous suspension of iron (II) hydroxide or carbonate, obtained by mixing an aqueous iron (II) salt solution with an aqueous alkali solution in substantially equivalent quantities, is oxidized by passing an oxygen-containing gas through it with stirring under atmospheric pressure at a temperature of about 0° to 50°C and the resulting iron (III) seed suspension allowed to grow into precipitated red iron (III) oxides by further oxidation with oxygen-containing gas at a temperature of about 50° to 100°C, optionally after a thermal treatment, in the presence of more iron (II) salt and alkali solution or optionally in the presence of iron (II) salt and metallic iron at a pH-value kept in the acid range. The novelty herein resides in the fact that the iron (III) seed suspension is prepared in the presence of a seed-mofifying foreign substance so that lattice-distorted chemically reactive finely divided δ—FeOOH seeds are formed.

Seed-modifying foreign substances suitable for the purposes of the invention include organic or inorganic compounds, for example, compounds of magnesium, calcium, copper, zinc, aluminum, antimony, phosphorus, arsenic, vanadium or silicon, or even mixtures of such compounds. Chlorides of magnesium, calcium and aluminum, even in the form of mixtures, also sodium phosphate and vanadium pentoxide, are particularly suitable. Examples of suitable organic seed-modifying substances include trihydric and polyhydric alcohols (for example glycerol, erythritol, pentaerythritol, mannitol and trimethylol propane), aliphatic monocarboxylic acids (for example glyceric acids and gluconic acids) or dicarboxylic acids with more than one alcohol group in the molecule (for example tartaric acid), aliphatic tricarboxylic acids having at least one alcohol group in the molecule (for example citric acid), hydroxy aldehydes or hydroxy ketones such as monosaccharides (for example ribose, arabinose, glucose, fructose, galactose and tannin), disaccharides, (for example saccharose and lactose) or poly-saccharides (for example starch, lignins and lignin sulfonates, and their derivatives). Salts of these acid-group-containing compounds, such as alkali metal, ammonium, alkaline earth metal or iron salts, can also be used with advantage, KNa-tartrate is just one example.

The following compounds show a particularly favorable effect: erythritol, mannitol, glyceric acid, K, Na-tartrate, Na-citrate, ribose, glucose, fructose, tannin, NH$_4$—, Ca—, Al—, Fe and Mg-lignin sulfonates.

The seed modifying substances for the process according to the invention can be used in quantities of from about 1 to 30 % by weight, preferably in quantities of about 4 to 20 % by weight, based on the iron present during seed formation.

The aforementioned additives widen the hitherto narrow degree of precipitation of 0.9 to 1.1 very considerably to values in the range of from 0.8 to 2.0, i.e. 0.8 to 2.0 equivalents of alkali solution, based on the quantity of iron (II) salt, can be used during seed formation. In the context of this invention, the term "alkali" is used in its broad sense, in other words it covers alkali and ammonium hydroxides and carbonates.

Iron chloride and/or iron sulfate can be used with advantage as the iron (II)-salts.

Compared with conventional precipitated red pigments and, in particular, with calcined iron (III) oxide red pigments, the red pigments which can be obtained by the new process, preferably less than 10 % and more preferably less than about 5 %, containing at most up to 15 % by weight of goethite, have greater tinting strength, have much greater colorimetric purity with fewer tinges of brown and give coatings of high-gloss. By virtue of their soft texture, some of the new pigments can also be used for totally new applications, for example as fillers or in the "flushing" process.

Seed formation and pigment formation are described hereinbelow. The variable parameters of seed formation, normally carried out at temperatures of from 0° to 50°C, preferably at temperatures of from 20° to 40°C, and of pigment formation, normally carried out at temperatures of from 50° to 100°C, preferably at temperatures of from 70° to 90°C, are set out in Table 1. The Example No. is followed by particulars on the type of iron (II) salt, the type and quantity of the addition, the type, molarity and equivalent ratio of the alkali or ammonium hydroxide or carbonate, the phase of phases determined by X-rays on normal seed (30°C) and heated seed (2 hours at 90°C). For pigment formation, the Table shows the quantities of seed in g converted in each case into Fe$_2$O$_3$, the type of iron (II) salt and alkali, the experimental time in hours, the color and the % by weight, determined by X-ray Debye-Scherrer method, of any yellow goethite present in addition to the red hematite ($\alpha$—Fe$_2$O$_3$).

In one preferred embodiment, 19.000 liters of water at about room temperature are initially introduced into an electrically heatable stainless steel container equipped with a gassing stirrer. 3.558 liters of a 1-molar iron (II) salt solution are then added, accompanied or followed by the addition of 2.000 liters of an alkali or ammonium hydroxide or carbonate solution of the molarity specified. The quantity of an addition specified in Table 1 can be added both to the water initially introduced and also to the iron (II) salt solution or to the alkali solution. This addition can also be distributed as required between the aforementioned liquids. The resulting suspension of iron (II) hydroxide or carbonate is then oxidized at 30°C with 2.5 m$^3$/hour of air and a gassing stirrer rotating at 1500 rpm over a period of about 4 to about 30 minutes, preferably over a period of 8 to 15 minutes, until an orange- to brownish-red color appears and hence until the iron (II) salt initially introduced has been completely converted. Instead of the gassing stirrer, it is possible to use any other highly effective stirrer and a ceramic, glass or metal frit to obtain good air distribution. According to X-ray analysis, the seed formed at around room temperature and under atmospheric pressure consists in every case of finely divided, lattice-distorted in chemical reaction active $\delta$—FeOOH. In one modification of the process according to the invention, this seed suspension can be heated to higher temperatures, below 100°C under normal pressure, above 100°C in an autoclave under pressures of up to 200 atms, preferably under pressures of from 1 to 40 atms, and thereafter used as seed for pigment formation. For phase control, all the seeds were kept for 2 hours at 90°C in their suspension and then examined by X-ray diffraction. According to the X-ray photographs, the product is in the form either of pure $\delta$—FeOOH—, pure $\alpha$—Fe$_2$O$_3$—phases or of phase mixtures of $\delta$—FeOOH— with $\alpha$—Fe$_2$O$_3$, or of $\alpha$—Fe$_2$O$_3$— with $\alpha$—FeOOH—, or of $\delta$—FeOOH— with $\alpha$—FeOOH— particles.

Specified quantities of the non-preheated or preheated seed, optionally concentrated by sedimentation and calculated uniformly as Fe$_2$O$_3$, are heated with stirring to 50° – 100°C, preferably to 70° – 90°C and mainly at 80°C in the stainless steel container used for seed formation and, after the temperature has been reached, are adjusted with an iron (II) salt to a pH-value below 7, preferably below 6.5, and diluted with water to a volume of 5.000 liters. After the required pigmentforming temperature has been reached, the introduction of air is commenced and uniformly equivalent quantities of an iron (II) salt solution and of an alkali or ammonium hydroxide or carbonate solution, preferably highly concentrated and thoroughly distributed, are added over a period of more than 1 hour, for reasons of quality and economy over a period of about 4 to about 16 hours, up to a volume of 24.000 liters. The required yellowish to blueish-red color (in Table 1, this is characterized in such a way that, with a number (type) increasing from 100 to 200, the color changes substantially uniformly from a yellowish to a blueish-red) is adjusted through the average particle size and the particle size distribution which are determined by the type and quantity of seed, the growth rate and by the seed-forming and pigmentforming temperature. In all the tests, the growth is equivalent to 2.150 kg of Fe$_2$O$_3$. For the same type of seed, therefore, the average particle size of the end product is essentially adjusted through the particular quantity of seed used.

In Table 1, Examples 1, 2 and 3, seeds were prepared in accordance with the prior art by completely precipitating an iron (II) sulfate solution with a sodium hydroxide or sodium carbonate solution (degree of precipitation 1.0). These seeds were allowed to grow to their full extent into precipitated iron (III) oxide pigments under conditions entirely comparable with the following Examples. In Examples 1 and 2, the iron (II) sulfate was precipitated equivalently (1.0) with NaOH and, in Example 3, with Na$_2$CO$_3$. In Example 1, the seed was used for pigment formation without heating and, in Example 2, after heating of its suspension for 2 hours to 90°C and, in Example 3, without preheating. According to X-ray analysis of the pigment, a precipitated iron (III) oxide pigment mixture is present in all the Examples, consisting in addition to $\alpha$—Fe$_2$O$_3$ of about 79 % by weight of $\alpha$—FeOOH in Example 1, of about 30 % by weight of $\alpha$—FeOOH in Example 2 and of about 99 % by weight of $\alpha$—FeOOH in Example 3. In Example 1, the precipitated iron (III) oxide pigments with very little colorimetric purity, dirty brown in color and weak in tinting strength show the yellowest red (type 110); in Example 2 a yellow red (type 120); and in Example 3, even an orange yellow. Accordingly, red iron (III) oxide pigments which are weak in their tinting strength, dirty brown in color and low in colorimetric purity are obtained in accordance with the prior art, consisting according to X-ray analysis of mixtures of hematite phases with a large to very large content (30 to 99 % by weight) of goethite phases. The prior art tests are followed from Example 4 onwards by the new tests with red iron (III) oxide pigments which have $\alpha$—FeOOH contents of 15 to 0 % by weight and which cover the entire color range from yellowish to blueish-red. A great number of inexpensive additions are found during seed formation, giving almost 100 % pure precipitated red iron (III) oxide pigments of hematite structure during pigment formation.

In a modified form of pigment formation, the seeds identified in Table 1 are not subjected to a growth process in which the iron (II) hydroxides or carbonates formed by the equivalent addition of an iron (II) salt solution and an alkali solution are converted on the seeds at elevated temperature either wholly or predominantly into $\alpha$—$Fe_2O_3$—pigments through oxidation with air or other oxygen-containing gases; instead iron scrap is added to them in a weakly acid solution containing iron (II) salt, in accordance with U.S. Pat. Nos. 1,327,061 and 1,368,748 (Penniman and Zoph), after which they are allowed to grow to their full extent by heating and passing air through over a prolonged period of time until the required yellowish to blueish-red color is obtained, the metallic iron being dissolved by the hydrogen ions liberated during hydrolysis at a rate commensurable with that at which the iron (II) salt is oxidized by the atmospheric oxygen into iron (III) salt and, as such, hydrolyzed on the seeds initially introduced, accompanied by their growth.

In one example of this variant of the process, seeds are prepared in accordance with Examples 5 and 15 of Table 1 and introduced in such a volume that 43 g of $Fe_2O_3$ are available for seed growth. Seeds, $FeSO_4$, water and 560 g of iron scrap are introduced into a stainless steel container equipped with an air inlet tube and stirring mechanisms, a volume of 6.000 liters made up and an $FeSO_4$-concentration of 9.0 g/liter of $FeSO_4$ adjusted. The stainless steel container stands in a tempered water bath. While air is introduced into it (at a rate of 50 liters per hour), accompanied by stirring (at 140 rpm), the pigment grows over a period of 4 days at 80°C from a yellowish to a blueish-red. Red iron (III) oxide pigment is obtained in yields of 750 and 464 g. According to X-ray analysis, about 99 and 98 % by weight of the red iron (III) oxide pigment consists of hematite and about 1 and 2 % by weight of goethite. The color shade corresponds to calcined iron (III) oxide red, type 180 and type 200, but is of much higher colorimetric purity and of higher tinting strength when dispersed in a paint.

Once the required color of the precipitated red iron (III)-oxide pigments has been reached, the pigment is feed from salts in conventional manner by washing, dried and ground, optionally after any incompletely reacted iron scrap has been separated off. The color of the precipitated red iron (III) oxide pigments prepared in accordance with the invention can be made slightly darker, especially in the case of yellowish red colors and in the case of pigments still containing a small proportion of goethite particles, by careful heating at temperatures of from 120° to 500°C, preferably at temperatures of from 150° to 350°C, this change in color being caused either through the elimination of water from the $\alpha$—FeOOH or by slight coarsening of the particles. In either case, the precipitated red iron (III)-oxide pigments produced in accordance with the invention are of higher colorimetric purity and of higher tinting strength by comparison with conventionally produced precipitated red iron (III)-oxide pigments, and, in addition, are softer than red iron (III) oxide pigments obtained by calcination because they are free from calcined hard aggregates. They are particularly suitable for the production of high-gloss coatings in the lacquer industry.

Table 1 variable parameters in the production of precipitated red iron (III) oxide pigments

| Ex. No. | Seed Formation | | | | | | | | Pigment Formation | | | | | |
|---|---|---|---|---|---|---|---|---|---|---|---|---|---|---|
| | Fe(II) salt | Addition Type | Addition Quantity (g) | Alkali Type | Alkali Conc. (mol/liter) | Precipitation (%) | Seed phases 30°C | Seed phases 2h 90°C | Quantity of seed (g $Fe_2O_3$) | Fe(II) salt | Alkali type | Running (h) | color type | % by weight of $\alpha$-FeOOH |
| 1 | $FeSO_4$ | — | — | NaOH | 3.560 | 100 | $\delta$-FeOOH | — | 172.5 | $FeSO_4$ | NaOH | 8 | 110 | 79.0 |
| 2 | '' | — | — | '' | '' | '' | '' | $\delta$-FeOOH | '' | '' | '' | '' | 120 | 30.0 |
| 3 | 41 | — | — | $Na_2CO_3$ | 1.780 | '' | '' | — | '' | '' | '' | '' | yellow | 99.0 |
| 4 | '' | $MgCl_2$ | 20.00 | NaOH | 3.950 | 105 | '' | $\delta$-FeOOH | '' | '' | '' | '' | 160 | 1.5 |
| 5 | '' | '' | '' | '' | 4.310 | 115 | '' | '' | '' | '' | '' | '' | 140 | 6.6 |
| 6 | '' | '' | '' | '' | 4.840 | 130 | '' | '' | '' | '' | '' | '' | '' | 3.0 |
| 7 | '' | $CaCl_2$ | 40.00 | '' | 5.910 | 160 | '' | $\alpha$-$Fe_2O_3$/$\delta$-FeOOH | '' | '' | '' | '' | 170 | 11.5 |
| 8 | '' | $MgSO_4$ | 25.25 | '' | 4.310 | 115 | '' | $\delta$-FeOOH | '' | '' | '' | '' | 130 | 7.4 |
| 9 | '' | $MgCl_2$ | 20.00 | '' | '' | '' | '' | '' | '' | '' | '' | '' | 140 | 2.0 |
| 10 | '' | '' | '' | '' | '' | '' | '' | '' | 129.4 | '' | '' | '' | 170 | <1.0 |
| 11 | '' | '' | '' | '' | '' | '' | '' | '' | 86.3 | '' | '' | '' | 180 | 3.0 |
| 12 | '' | '' | '' | '' | '' | '' | '' | '' | 64.7 | '' | '' | '' | '' | 5.0 |
| 13 | '' | '' | '' | '' | '' | '' | '' | ''¹⁾ | 151.0 | '' | '' | '' | 160 | 1.0 |
| 14 | '' | '' | '' | '' | '' | '' | $\delta$-FeOOH | — | 129.4 | '' | '' | '' | 130 | 14.5 |
| 15 | '' | $CaCl_2$ | 40.00 | '' | 4.460 | 115 | '' | $\alpha$-$Fe_2O_3$ | 172.5 | $FeSO_4$ | NaOH | 8 | 180 | 2.0 |
| 16 | '' | '' | '' | '' | 3.210 | 90 | '' | $\delta$-FeOOH | 129.4 | '' | '' | '' | 160 | 14.0 |
| 17 | '' | '' | 60.00 | '' | 4.640 | 115 | '' | $\alpha$-$Fe_2O_3$ | 172.5 | '' | '' | '' | 170 | 4.0 |
| 18 | '' | '' | 40.00 | '' | 4.460 | '' | '' | $\alpha$-$Fe_2O_3$²⁾ | 172.5 | '' | '' | '' | 160 | 6.0²⁾ |
| 19 | '' | '' | '' | '' | '' | '' | '' | '' | 129.4 | '' | '' | '' | 170 | 5.0 |
| 20 | $FeCl_2$ | '' | '' | '' | '' | '' | '' | $\alpha$-$Fe_2O_3$ | 172.5 | $FeCl_2$ | '' | '' | '' | 14.5 |
| 21 | '' | '' | '' | $Na_2CO_3$ | 2.230 | '' | '' | '' | 129.4 | '' | $Na_2CO_3$ | '' | '' | 5.0 |
| 22 | '' | '' | '' | '' | '' | '' | '' | '' | '' | $FeSO_4$ | NaOH | '' | '' | 8.0 |
| 23 | '' | '' | '' | '' | '' | '' | '' | '' | '' | '' | $Na_2CO_3$ | '' | 180 | 2.0 |

Table 1-continued variable parameters in the production of precipitated red iron (III) oxide pigments

| Ex. No. | Seed Formation | | | | | | | | Pigment Formation | | | | | |
|---|---|---|---|---|---|---|---|---|---|---|---|---|---|---|
| | Fe(II) salt | Addition Type | Quantity (g) | Type | Alkali Conc. (mol/liter) | Precipitation (%) | Seed phases 30°C | 2h 90°C | Quantity of seed (g Fe₂O₃) | Fe(II) salt | Alkali type | Running (h) | color type | % by weight of α-FeOOH |
| 24 | FeSO₄ | CaCl₂/AlCl₃ | 10.0/12.0 | NaOH | 4.324 | ″ | ″ | ″ | 172.5 | ″ | NaOH | 6 | ″ | 4.5 |
| 25 | ″ | ″ | ″ | ″ | ″ | ″ | ″ | ″ | ″ | ″ | ″ | 8 | ″ | <1.0 |
| 26 | ″ | ″ | ″ | ″ | ″ | ″ | ″ | ″ | ″ | ″ | ″ | 12 | ″ | 2.0 |
| 27 | ″ | ″ | ″ | ″ | ″ | ″ | ″ | ″ | ″ | ″ | ″ | 8 | ″ | <1.0³⁾ |
| 28 | ″ | MgCl₂/AlCl₃ | 10.0/14.0 | ″ | 4.360 | ″ | ″ | δ-FeOOH/α-Fe₂O₃ | ″ | ″ | ″ | ″ | 160 | <1.0 |
| 29 | ″ | ZnCl₂/AlCl₃ | 10.0/9.8 | ″ | 4.285 | ″ | ″ | δ-FeOOH/α-FeOOH | ″ | ″ | ″ | ″ | 180 | 4.0 |
| 30 | ″ | SbCl₃ | 30.00 | ″ | 4.295 | ″ | ″ | δ-FeOOH | ″ | ″ | ″ | ″ | 130 | 14.5 |
| 31 | ″ | Na₃PO₄ | ″ | ″ | 4.098 | ″ | ″ | ″ | ″ | ″ | ″ | ″ | 140 | <1.0 |
| 32 | ″ | ″ | ″ | ″ | ″ | ″ | ″ | — | 129.4 | ″ | ″ | ″ | 160 | 4.0 |
| 33 | ″ | V₂O₅ | ″ | ″ | 4.585 | ″ | ″ | δ-FeOOH | ″ | ″ | ″ | ″ | 180 | <1.0 |
| 34 | ″ | SiO₂***) | ″ | ″ | 3.970 | ″ | ″ | ″ | ″ | ″ | ″ | ″ | 140 | 14.5 |
| 35 | ″ | glycerol | ″ | ″ | 4.098 | ″ | ″ | ″ | 172.5 | ″ | ″ | ″ | 170 | 3.5 |
| 36 | ″ | erythritol | ″ | ″ | ″ | ″ | ″ | ″ | ″ | ″ | ″ | ″ | 140 | 1.0 |
| 37 | ″ | mannitol | ″ | ″ | ″ | ″ | ″ | ″ | ″ | ″ | ″ | ″ | 130 | <1.0 |
| 38 | ″ | ″ | ″ | ″ | ″ | ″ | ″ | — | 129.4 | ″ | ″ | ″ | ″ | 7.0 |
| 39 | ″ | trimethylolpropane | ″ | ″ | ″ | ″ | ″ | α-Fe₂O₃/α-FeOOH | 172.5 | ″ | ″ | ″ | 170 | 14.5 |
| 40 | ″ | pentaerythritol | ″ | ″ | 4.098 | ″ | ″ | α-Fe₂O₃/α-FeOOH | ″ | ″ | ″ | ″ | 170 | 13.5 |
| 41 | ″ | glyceric acid | ″ | ″ | 4.240 | ″ | ″ | δ-FeOOH | ″ | ″ | ″ | ″ | 140 | 1.0 |
| 42 | ″ | K-gluconate | 35.85 | ″ | 4.098 | ″ | ″ | ″ | ″ | ″ | ″ | ″ | 130 | 5.5 |
| 43 | ″ | K,Na-tartrate | 30.00 | ″ | ″ | ″ | ″ | ″ | ″ | ″ | ″ | ″ | 160 | <1.0 |
| 44 | ″ | ″ | ″ | ″ | ″ | ″ | ″ | — | 129.4 | ″ | ″ | ″ | 170 | 2.0 |
| 45 | ″ | Na-citrate | ″ | ″ | 3.740 | 105 | ″ | δ-FeOOH | 172.5 | ″ | ″ | ″ | ″ | 1.0 |
| 46 | ″ | ″ | ″ | ″ | 4.098 | 115 | ″ | α-Fe₂O₃ | ″ | ″ | ″ | ″ | 180 | 3.0 |
| 47 | ″ | ″ | ″ | ″ | ″ | ″ | ″ | — | 129.4 | ″ | ″ | ″ | 130 | 14.5 |
| 48 | ″ | ribose | ″ | ″ | ″ | ″ | ″ | δ-FeOOH | ″ | ″ | ″ | ″ | 160 | 1.0 |
| 49 | ″ | arabinose | ″ | ″ | ″ | ″ | ″ | ″ | 172.5 | ″ | ″ | ″ | 130 | 4.5 |
| 50 | ″ | glucose | ″ | ″ | ″ | ″ | ″ | ″ | ″ | ″ | ″ | ″ | 130 | 1.5 |
| 51 | ″ | fructose | ″ | ″ | ″ | ″ | ″ | ″ | 129.4 | ″ | ″ | ″ | 160 | 1.0 |
| 52 | ″ | galactose | ″ | ″ | ″ | ″ | ″ | ″ | 172.5 | ″ | ″ | ″ | 130 | 4.0 |
| 53 | ″ | tannin | ″ | ″ | ″ | ″ | ″ | ″ | ″ | ″ | ″ | ″ | 140 | <1.0 |
| 54 | ″ | saccharose | ″ | ″ | ″ | ″ | ″ | ″ | 129.4 | ″ | ″ | ″ | ″ | 7.0 |
| 55 | ″ | lactose | ″ | ″ | ″ | ″ | ″ | ″ | 172.5 | ″ | ″ | ″ | 130 | |
| 56 | ″ | NH₄-ligninsulphonate | ″ | ″ | ″ | ″ | ″ | α-Fe₂O₃ | ″ | ″ | ″ | ″ | 180 | 1.5 |
| 57 | ″ | Ca-ligninsulphonate | ″ | ″ | ″ | ″ | ″ | ″ | ″ | ″ | ″ | ″ | ″ | <1.0 |
| 58 | ″ | Al-ligninsulphonate | ″ | ″ | ″ | ″ | ″ | ″ | ″ | ″ | ″ | ″ | ″ | <1.0 |
| 59 | ″ | Fe-ligninsulphonate | ″ | ″ | ″ | ″ | ″ | ″ | ″ | ″ | ″ | ″ | 180 | 1.5 |
| 60 | ″ | Mg-ligninsulphonate | ″ | ″ | ″ | ″ | ″ | α-Fe₂O₃/δ-FeOOH | ″ | ″ | ″ | ″ | 170 | <1.0 |

¹⁾seed-forming temperature 20°C
²⁾heated for 2 h at 160°C in an autoclave.
³⁾Pigment formation 90°C.
⁴⁾in the form of soda waterglass

What is claimed is:

1. In the production of a precipitated red iron (III) oxide pigment of hematite structure wherein an aqueous iron (II) salt solution is mixed with an aqueous alkali solution in substantially equivalent quantities to produce an aqueous suspension of iron (II) hydroxide or carbonate, the suspension is oxidized by passing oxygen-containing gases through it with stirring under atmospheric pressure at a temperature of about 0° to 50°C to form a suspension of iron (III) seed, and the resulting iron (III) seed suspension is allowed to grow into precipitated red iron (III) oxide pigment by further oxidation with an oxygen-containing gas at a temperature of about 50° to 100°C in the presence of more iron (II) salt and alkali solution or in the presence of iron (II) salt and metallic iron at a pH-value kept in the acid range, the improvement which comprises producing the iron (III) seed suspension by oxidation with the oxygen-contaning gases for about 4 to 30 minutes and in the presence of at least one foreign modifying substance selected from the group consisting of a compound of magnesium, calcium, copper, zinc, aluminum, antimony, phosphorus, arsenic, vandium and silicon, so that lattice-distorted chemically reactive finely divided delta—FeOOH seeds are formed, whereby the resulting red iron (III) oxide pigment contains less than about 15% by weight of $\alpha$—FeOOH.

2. A process as claimed in claim 1, wherein said compound is at least one member selected from the group consisting of chlorides of magnesium, calcium and aluminum, or vanadium pentoxide, and sodium phosphate.

3. A process as claimed in claim 1, wherein the seed-modifying foreign substance is used in about 1 to 30% by weight based on the iron present during seed formation.

4. A process as claimed in claim 1, wherein the seed formation is effected in the presence of about 0.8 to 2.0 equivalents of aqueous alkali solution, based on the quantity of iron (II) salt present.

5. A process as claimed in claim 1, wherein the newly formed seed prior to said further oxidation is subjected to a thermal treatment at a temperature above about 50°C and up to 100°C under normal pressure and above 100°C under excess pressure in an autoclave.

6. A process as claimed in claim 5, wherein the seed-modifying foreign substance is used in about 4 to 20% by weight, the temperature during seed formation is about 20° to 40°C, and pigment formation is carried out at a temperature of about 70° to 90°C.

7. In the production of a precipitated red iron (III) oxide pigment of hematite structure wherein an aqueous iron (II) salt solution is mixed with an aqueous alkali solution in substantially equivalent quantities to produce an aqueous suspension of iron (II) hydroxide or carbonate, the suspension is oxidized by passing oxygencontaining gases through it with stirring under atmospheric pressure at a temperature of about 0° to 50°C to form a suspension of iron (III) seed, and the resulting iron (III) seed suspension is allowed to grow into precipitated red iron (III) oxide pigment by further oxidation with an oxygen-containing gas at a temperature of about 50° to 100°C in the presence of more iron (II) salt and alkali solution or in the presence of iron (II) salt and metallic iron at a pH-value kept in the acid range, the improvement which comprises producing the iron (III) seed suspension by oxidation with the oxygen-containing gases for about 4 to 30 minutes and in the presence of at least one foreign modifying substance selected from the group consisting of a trihydric or polyhydric alcohol, aliphatic monocarboxylic acid, dicarboxylic acid with more than one alcohol group in the molecule, aliphatic tricarboxylic acid with at least one alcohol group in the molecule, and monosaccharide, disaccharide or polysaccharide hydroxyaldehyde or hydroxyketone, so that lattice-distorted chemically reactive finely divided delta—FeOOH seeds are formed, whereby the resulting red iron (III) oxide pigment contains less than about 15% by weight of $\alpha$—FeOOH.

8. A process as claimed in claim 7, wherein the seed-modifying foreign substance is used in about 1 to 30% by weight based on the iron present during seed formation.

9. A process as claimed in claim 7, wherein the seed formation is effected in the presence of about 0.8 to 2.0 equivalents of aqueous alkali solution, based on the quantity of iron (II) salt present.

10. A process as claimed in claim 7, wherein the newly formed seed prior to said further oxidation is subjected to a thermal treatment at a temperature above about 50°C and up to 100°C under normal pressure and above 100°C under excess pressure in an autoclave.

11. A process as claimed in claim 7, wherein the seed-modifying foreign substance is used in about 4 to 20% by weight, the temperature during seed formation is about 20 to 40°C, and pigment formation is carried out at a temperature of about 70° to 90°C.

12. A process as claimed in claim 7, wherein the seed-modifying foreign substance is at least one member selected from the group consisting of erythritol, mannitol, glyceric acid, K,Na-tartrate, Na-citrate, ribose, glucose, fructose, tannin, and $NH_4$—, Ca—, Al—, Fe— and Mg—lignin sulfonate.

* * * * *